Oct. 13, 1931. W. W. WOODROOF 1,827,342
ELECTRICAL SIGNALING SWITCH
Filed Nov. 3, 1927 2 Sheets-Sheet 1
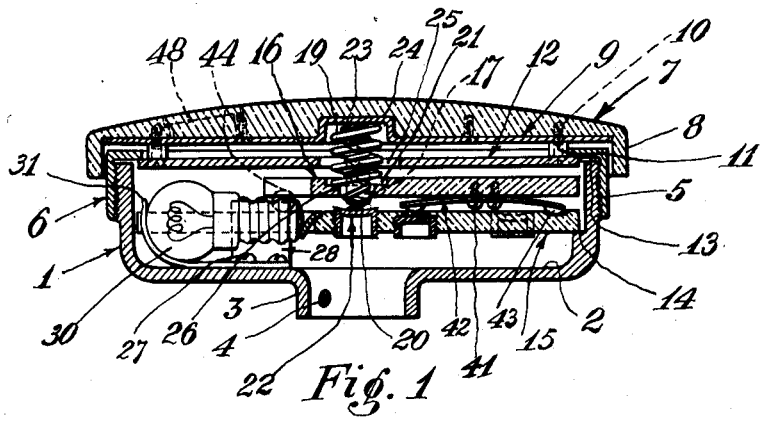
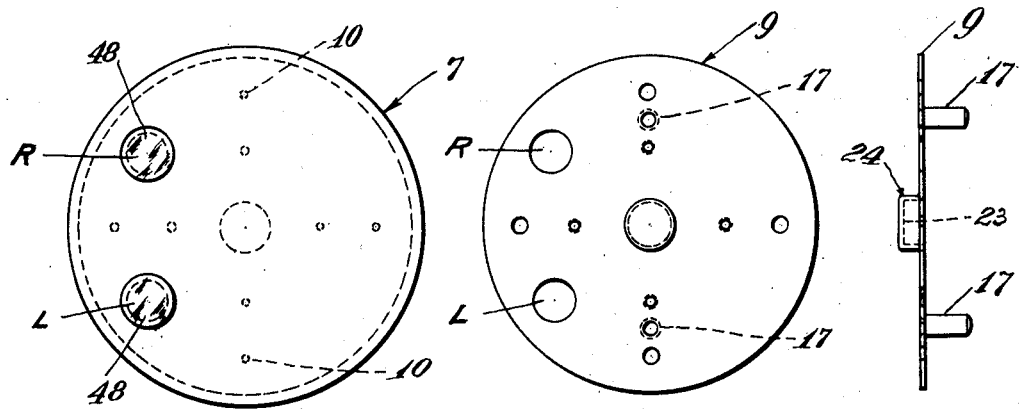
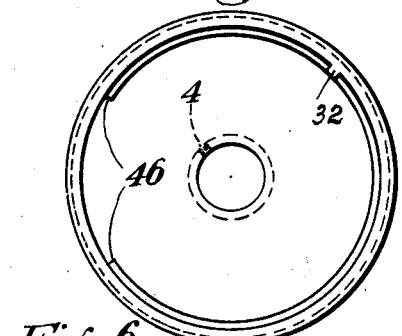
Fig. 6
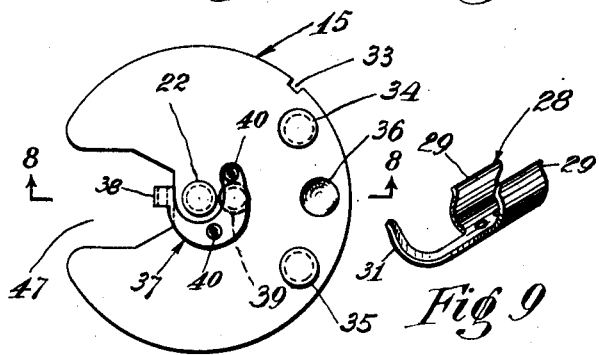
Fig. 7 Fig. 9
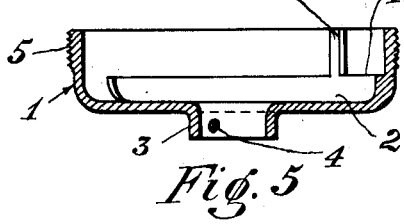
Fig. 5
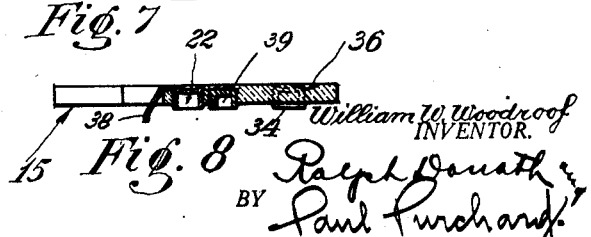
Fig. 8
William W. Woodroof
INVENTOR.
BY Ralph Donath
Paul Purchard
ATTORNEYS.

Oct. 13, 1931.   W. W. WOODROOF   1,827,342
ELECTRICAL SIGNALING SWITCH
Filed Nov. 3, 1927   2 Sheets-Sheet 2

William W. Woodroof
INVENTOR.
Ralph Donath
BY Paul Purchard
ATTORNEYS.

Patented Oct. 13, 1931

1,827,342

UNITED STATES PATENT OFFICE

WILLIAM W. WOODROOF, OF PITTSBURGH, PENNSYLVANIA

ELECTRICAL SIGNALING SWITCH

Application filed November 3, 1927. Serial No. 230,743.

This invention relates to electrical signaling switches to be used on automobiles and the like.

The primary object of this invention is to provide a rotary switch by means of which the driver of an automobile may inform the public by means of simultaneously or separately operable light and sound signals of his intention of making a turn. Another object of this switch is to inform the public by means of light-signals of the direction of the turn which the automobile driver is about to make. A further object of this invention is to provide a switching device by means of which an automobile driver may ascertain the perfect operation of the front and/or rear signal-lights, without leaving his seat. Still another object of this invention is the provision of a switching device which is very simple in construction and operation and which is adapted to be mounted, preferably, on the steering wheel in the place now reserved for the push-button of the horn.

Additional features and advantages of this invention will appear from the following description considered in connection with the accompanying drawings forming part of this application and in which:

Fig. 1 is an enlarged sectional view through a switch built in accordance with this invention, some of the parts being shown in elevation.

Fig. 2 is a top plan view of Fig. 1.

Figs. 3 and 4 are respectively a top plan view and side elevation of the grounding plate of the switch.

Figs. 5 and 6 show a sectional view and a top plan view of the so-called housing of the switch.

Fig. 7 is a top plan view of the stationary contact-plate.

Fig. 8 shows a section taken on line 8—8 in Fig. 7.

Fig. 9 is a perspective view of a special socket for the pilot light of the device.

Figure 10:
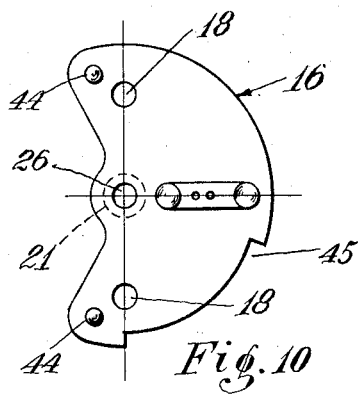
Figs. 10 and 11 represent respectively the top plan view and a side elevation of the movable contact-plate.
Figure 12:
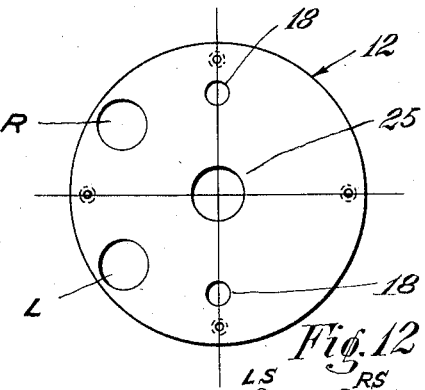
Figs. 12 and 13 are respectively the top plan view and a side elevation of the so-called holding disc.
Figure 13:
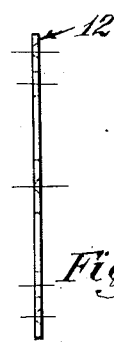
Figure 11:
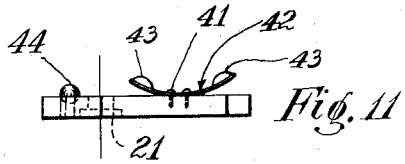
Figure 14:
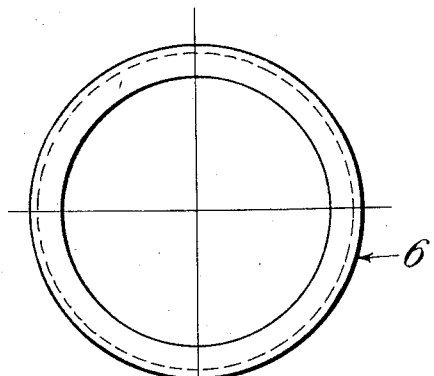
Fig. 14 is a top plan view of the stop collar of the device.

This application is intended to cover important additions and improvements made to the lighting system switch which forms the subject matter of the Letters Patent granted to me on the 19th day of July, 1927, and bearing the number 1,636,347.

Reference being had to the drawings a signaling switch built according to the accompanying drawings comprises a circular housing 1 open at the top and having centrally of the bottom 2 an extension 3 whereby the housing may be connected to the central post of a steering wheel in any desired and suitable manner, such as for instance, by means of a set screw inserted in the threaded aperture 4. At the top, the housing is provided with outside threads 5 upon which is secured the internally threaded stop-collar 6, of substantially L-shaped cross-section.

The switching apparatus is closed at the top by means of a rotatable cover 7 made preferably of hard rubber or other suitable and desired insulating material. This cover has a peripheral flange 8 which surrounds the upper part of the stop-collar and is guided thereby for rotation. Inside the cover is the grounding-plate 9 the purpose of which is to strengthen the cover and to establish an electrical ground-connection in a manner to be described later. Depending from the cover and secured thereto by means of the screws 10 and the spacer-sleeve 11 is the centrally apertured holding disc 12 which reaches into the housing and is adapted to engage the underside of the horizontal portion 13 of the stop-collar 6.

The inside of the peripheral wall of the housing is counterbored to a suitable depth to produce a seat 14 for the stationary contact plate 15, and intermediate the latter and the holding disc 12 is positioned the movable contact plate 16, which is operated by rotating the cover 7, being connected thereto by means of two diametrically disposed pins 17 secured to the grounding plate 9 and slidingly engaging suitably placed apertures 18 provided in said movable contact plate.

The cover is normally held in the raised position shown in Fig. 1 by means of the two concentrically disposed coil-springs 19 and 20; the former performing only the mechanical function of lifting the cover whereas the latter serves mainly to establish electrical connections, which will be described further on. The spring 19 rests at the bottom in a recess 21 provided in the movable contact plate 16, and spring 20 rests at its lower end on the contact 22 positioned centrally in the stationary contact plate. The upper ends of said two springs press against the bottom 23 of a depression 24 formed in the center of the grounding-plate. As shown in the drawings the holding disc 12 and the movable contact plate have suitable apertures 25 and 26 respectively to accommodate said springs.

In the bottom of the housing 1 is secured by screws 27 a lamp socket 28 which, as shown in Fig. 9, comprises two suitably curved resilient sides 29, adapted to clamp about the screw portion of the electric pilot lamp 30, Fig. 1, and a bent up extension or finger 31 intended to engage the bulb portion of said lamp. This socket enables the insertion of an electric bulb of ample size by direct pressure instead of by the usual screwing in method, the latter method being in the present embodiment unsuitable owing to the limited size of the switching device.

The stationary contact-plate is held against rotation in the housing by means of a lug 32 formed in the housing and engaging a slot 33 provided in the periphery of said contact plate.

In addition to the central contact 22, the stationary contact plate has two spaced contacts 34 and 35 and a cup shaped depression 36 disposed halfway between the contacts and at the same distance from the center of the plate. Partly surrounding the central contact 22 is the arcuate contact strip 37 which is shown encased in the plate and which has a resilient contact-finger 38 adapted to engage the center pole of the pilot lamp. This contact-strip connects permanently with a fourth contact 39 and it is secured on the plate by means of countersunk screws 40.

Upon the underside of the movable contact plate is secured by means of screws 41 the resilient connector 42 having at both ends contact-buttons 43 suitably spaced to connect together either one of the contacts 34, 35 with the contact-strip 37. The movable contact-plate is held in proper spaced relation to the stationary plate by means of two bearing balls 44, partly embedded in the movable plate and which, together with the contact buttons 43, form a three-pointed support for said movable contact plate. The latter has a portion of its periphery cut away, as at 45, to be engaged by the lug 32, thus providing stops for limiting the rotation of the cover and movable contact-plate to the proper amount required to make connections with either one of the contacts 34 or 35 with the contact strip 37.

To provide room for the pilot lamp 30 the seat 14 is discontinued as shown at 46 and the stationary contact plate is provided with a suitable opening 47. For the same reason, the movable contact-plate is not made full round.

The purpose of the pilot light being to inform the driver of an automobile of the condition of the front and rear signal lamps, it is necessary to let the light of the pilot shine through the cover. To this end, the holding disc 12, the grounding plate 9 and the cover 7 are each provided with two spaced circular apertures marked R. and L. in the drawings. The apertures bearing the same identification letter are, of course, in co-axial alignment and the angular space between the "R" and "L" openings is such that the pilot light will be directly underneath one of said groups of openings, according to the electrical connection established by the connector 42. To prevent the entrance of dust or other foreign matter in the switching device, the openings R and L in the cover are preferably closed by transparent glass lenses 48 which, if desired, may be given different colors corresponding to the colors, if any, of the right hand and left hand signal lamps.

Figure 18:
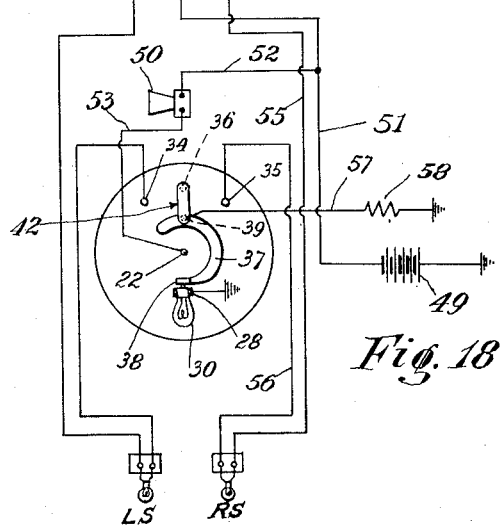
Fig. 18 is a diagram showing the electrical connections of the switch for the parts controlled thereby.
Figure 15:
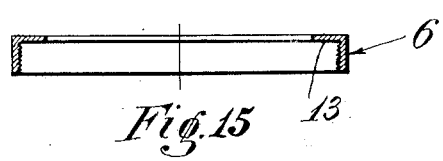
Fig. 15 is a cross-section through Fig. 14.
Figure 16:
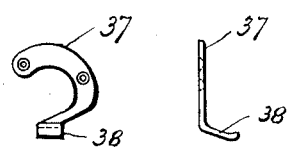
Figs. 16 and 17 represent a contact-strip mounted on the stationary contact plate.
Figure 17:
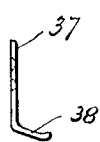

Based on the foregoing description and assisted by the wiring diagram illustrated in Fig. 18, the operation of my signaling switch will be readily understood and may be succinctly described as follows: In the diagram, 49 represents a source of electrical energy, such as a storage battery having a grounded connection; 50 represents an audible signal, such as a horn and R S, L S indicate respectively the right hand and left hand signal lamps mounted, in the present example, at the front and rear of the automobile.

When the connector 42 is in the neutral position shown in the diagram, no current will flow either through the signal lamps, the pilot lamp 30 or the horn 50. However, by depressing the cover so that the grounding plate 9 will contact with the stop-collar 6, a ground connection will be established and the horn will be energized, the current from the battery passing through the wires 51, 52, the horn 50, the wire 53, the contact 22, the spring 20 and finally through the housing of the switch which is grounded. The cover of the switch is yieldingly maintained in the neutral position by the outer contact button 43 of the connector 42 engaging the depression 36 in the stationary contact-plate 15.

If the driver wishes to turn to the right, for instance, he informs the public of his intention by turning the cover 7 to the right as far as it will go. This brings the connector 42 in engagement with the contact 35 and the following circuit is set up. From the battery the current flows successively through the wire 51, the common wire 54, the front signal lamp RS, through the wire 55 to the rear signal lamp RS, thence through the wire 56 to the contact 35, the connector 42, the contact strip 37, the contact 39, the wire 57, the resistance 58 and finally to the ground. At the same time a parallel circuit represented by the contact strip 37 and the grounded lamp socket 28 is established whereby the pilot-lamp 30 is ignited. The light of the latter will, of course shine through the cover opening R and inform the driver that the right hand signal lamps are lit.

The reason for inserting the resistance 58 in the ground line 57 is to divert a portion of the current into the pilot lamp. The magnitude of this resistance is, of course, governed by the normal operating voltage of the pilot-lamp.

It will be noted that should one of the signal lamps be burnt out, the circuit would be broken and the pilot-lamp would fail to glow, thus informing the driver of the trouble. On the other hand, the failure of the pilot-lamp will not effect the proper operation of the signal-lamps. It will also be seen from the diagram that the electrical circuit for the horn 50 is independent of either signal or pilot lamps, and that the horn may be sounded any time by pressing down the cover of the switch.

The left hand signal lamps LS are connected in a similar manner as the right hand signal lamps and their operation will be readily understood by following the wiring diagram.

In the drawings, the various contacts on the stationary contact-plate are shown hollow on the underside to facilitate the insertion and soldering of the ends of the wires connected thereto.

As will be understood, as suggested herein, there may be slight changes made in the construction and arrangement of the details of my invention without departing from the field and scope of the same, and I intend to include all such variations, as fall within the scope of the appended claim, in this application in which the preferred form only of my invention is disclosed.

I claim:

In a switch, the combination of an electrically grounded housing having a lamp-socket electrically connected thereto; an electric lamp for said socket, a stationary contact-plate and a rotatable contact-plate, a plurality of contact elements positioned on the stationary plate and cooperating with said contact elements for establishing specific electric circuits, said stationary and rotatable contact-plates having peripherally disposed cut-away portions for accommodating said lamp socket and lamp.

In testimony whereof I affix my signature.

WILLIAM W. WOODROOF.